US006978674B2

(12) United States Patent
Fell et al.

(10) Patent No.: US 6,978,674 B2
(45) Date of Patent: Dec. 27, 2005

(54) VIBRATORY GYROSCOPIC RATE SENSOR

(75) Inventors: Christopher P Fell, Plymouth (GB); Rebecka Eley, Plymouth (GB); Colin H. J. Fox, Nottingham (GB); Stewart McWilliam, Nottingham (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 10/475,015

(22) PCT Filed: Sep. 6, 2002

(86) PCT No.: PCT/GB02/04056

§ 371 (c)(1), (2), (4) Date: Oct. 16, 2003

(87) PCT Pub. No.: WO03/025503

PCT Pub. Date: Mar. 27, 2003

(65) Prior Publication Data

US 2004/0134278 A1 Jul. 15, 2004

(30) Foreign Application Priority Data

Sep. 14, 2001 (GB) .......................................... 0122256

(51) Int. Cl.[7] .............................................. G01P 9/04
(52) U.S. Cl. ................................................ 73/504.13
(58) Field of Search ....................... 73/504.13, 504.02, 73/504.04, 504.12, 504.14, 504.15, 504.16

(56) References Cited

U.S. PATENT DOCUMENTS

| | | | |
|---|---|---|---|
| 5,226,321 | A | 7/1993 | Varnham et al. |
| 5,817,940 | A | 10/1998 | Kobayashi et al. |
| 5,915,276 | A | 6/1999 | Fell |
| 5,932,804 | A | 8/1999 | Hopkin et al. |
| 6,089,090 | A | 7/2000 | Namerikawa et al. |
| 6,151,964 | A | 11/2000 | Nakajima |
| 6,272,925 | B1 | 8/2001 | Watson |
| 6,282,958 | B1 | 9/2001 | Fell et al. |
| 6,343,509 | B1 | 2/2002 | Fell et al. |
| 6,401,534 | B1 | 6/2002 | Fell et al. |

FOREIGN PATENT DOCUMENTS

| | | | |
|---|---|---|---|
| EP | 0 619 471 | A | 10/1994 |
| EP | 0 836 073 | A | 4/1998 |
| EP | 0 859 219 | A | 8/1998 |
| GB | 2 318 184 | A | 4/1998 |
| GB | 2 322 196 | | 8/1998 |
| GB | 2 335 273 | A | 9/1999 |
| GB | 2 338 781 | | 12/1999 |
| WO | 99/22203 | A | 5/1999 |
| WO | 99/47890 | A | 9/1999 |
| WO | 99/47891 | A | 9/1999 |
| WO | 00/09971 | | 2/2000 |
| WO | 01/53776 | | 7/2001 |
| WO | 01/55675 | | 8/2001 |

*Primary Examiner*—Helen Kwok
(74) *Attorney, Agent, or Firm*—Nixon & Vanderhye P.C.

(57) ABSTRACT

A two axis gyroscope including a substantially planar vibratory resonator (5) having a substantially ring or hoop-like structure with inner and other peripheries extending around a common axis, carrier mode drive (22) for causing the resonator (5) to vibrate in a cosnθ vibration mode, carrier mode pick-off (23) for sensing movement of the resonator (5) in response to the carrier mode drive (22), X-axis response mode pick-off (25) for detecting movement of the resonator in response to rotation about the X-axis, X-axis response mode drive (24) for nulling said motion, y-axis response mode pick-off (27) for detecting movement of the resonator in response to rotation about the y-axis, y-axis response mode drive (26) for nulling said motion, and a support (9) for flexibly supporting the resonator (5) and for allowing the resonator to vibrate relative to the support (9) in response to the carrier mode drive (22) and to applied rotation, wherein the support (9) comprises only L legs, where, when L is even:

$$L=2N/K, \text{ and}$$

where, when L is odd:

$$L=N/K$$

where K is an integer, L>2 and N is the carrier mode order.

5 Claims, 8 Drawing Sheets

VIBRATORY GYROSCOPIC RATE SENSOR

This application is the US national phase of international application PCT/GB02/04056, filed 06 Sep. 2002, which designated the US. PCT/GB02/04056 claims priority to GB Application No. 0122256.1, filed 14 Sep. 2001. The entire contents of these applications are incorporated herein by reference.

BACKGROUND OF THE INVENTION

1. Field of the Invention

This invention relates to rate sensors for sensing applied rate about two axes.

2. Discussion of Prior Art

The use of ring shaped resonators in two axis Coriolis rate sensors is well known. Examples of such devices and their mode of operation are described in GB 2335273 and GB 2318184.

The devices described in GB 2335273 make use of a single out of plane cos Nθ vibration mode (where N is the mode order) in combination with a degenerate pair of in plane sin(N±1)θ/cos(N±1)θ vibrations modes. The out of plane cos Nθ mode acts as the primary carrier mode which is typically maintained at a fixed vibration amplitude. Under rotation around the appropriate axes, Coriolis forces are induced which couple energy into the in plane sin(N±1)θ/cos(N±1)θ modes. The amplitude of the induced in plane response mode motion is directly proportional to the applied rotation rate.

The two axis rate sensor designs described in GB 2318184 make use of a single in plane cos Nθ vibration mode in combination with a degenerate pair of out of plane sin(N±1)θ/cos(N±1)θ vibration modes. The in plane cos Nθ mode acts as the primary carrier mode which is typically maintained at a fixed vibration amplitude. Under rotation around the appropriate axes, Coriolis forces are induced which couple energy into the out of plane sin(N±1)θ/cos (N±1)θ modes. The amplitude of the induced out of plane response mode motion is directly proportional to the applied rotation rate.

In all of the example devices the carrier and the two response mode frequencies are required to be nominally identical. With these frequencies accurately matched the amplitude of the response mode vibration is amplified by the mechanical quality factor, Q, of the structure. This inevitably makes the construction tolerances more stringent. In practice, it may be necessary to fine-tune the balance of the vibrating structure or resonator by adding or removing material at appropriate points. This adjusts the stiffness of mass parameters for the modes and thus differentially shifts the mode frequencies. Where these frequencies are not matched the Q amplification does not occur and the pick-offs must be made sufficiently sensitive to provide adequate gyroscope performance. For a perfect unsupported ring structure fabricated from radically isotropic material, any given pair of in or out of plane sin Nθ/cos Nθ modes will have identical frequencies for any value of N. This degeneracy may be perturbed due to the requirement for the leg structures which support the ring. These have the effect of point spring masses acting at the point of attachment to the ring which will alter the modal mass and stiffness. In the designs described above, the number and spacing of the support legs is such that the symmetry of the response mode pair is maintained. The stated condition to achieve this requirement is that the number of legs, L, is given by:

$$L=4\times N$$

where N is the response mode order. These legs are set at an angular separation of 90°/N. The resonator dimensions are set in order to match the carrier mode frequency to that of the response mode pair. Matching of the frequency of the second complementary mode of the carrier mode pair is not required.

Inducing a deliberate, large frequency split between the cos Nθ carrier mode and its complementary sin Nθ mode is desirable in that it prevents any undesirable interaction between these modes and fixes the orientation of the carrier mode on the ring. Fixing the mode orientation enables the carrier mode drive and pick-off to be precisely aligned in their optimum angular location to excite and detect the carrier mode vibration. GB-A-2335273 and GB-A-2318184 do not provide any teaching on how to achieve a large frequency split with know fixed mode orientations for the Cos Nθ carrier mode and its complementary sin Nθ mode.

This requirement for the number of legs indicates that, for a sin 2θ/cos θ mode pair, eight support legs will be needed, twelve for a sin 3θ/cos 3θ mode pair, sixteen for a sin 4θ/cos 4θ mode pair etc. These leg structures are required to suspend the ring but must allow it to vibrate in an essentially undamped oscillation in response to applied drive forces and Coriolis forces induced as a result of rotation of the structure. A leg design suitable for suspending dual axis rate sensors using planar ring structures in shown in FIG. 1. This design has twelve legs and would be an appropriate arrangement for use with sensors using sin 3θ/cos 3θ mode pairs according to the prior art (number of legs=4XN, where N=3). These support legs have a linear part 9' attached to the inner circumference of the ring 5 extending radially towards the common axis 8, a second linear part 9" extending from a central boss 20 on an insulating substrate 10 away from the central axis 8 and radially displaced from the first part. The first and second part are connected by an arcuate section 9'" concentric with the ring 5. The three parts will be integrally formed. It will be understood by those skilled in the art that other leg designs can be employed (e.g. S shaped or C shaped structures) which provide the same function in supporting the ring structure. Additionally these legs may be attached either internally or externally to outer rim 7 of the ring structure.

For devices such as these, the radial and tangential stiffness of the legs should be significantly lower than that of the ring itself so that the modal vibration is dominated by the ring structure. The radial stiffness is largely determined by the length of the arcuate segment 9'" of the leg. The straight segments 9' and 9" of the leg dominate the tangential stiffness. The overall length of the leg structure largely determines the out of plane stiffness. Maintaining the ring to leg compliance ratio, particularly for the radial stiffness, for this design of leg becomes increasingly difficult as the arc angle of the leg structure is restricted by the proximity of the adjacent legs. This requirement places onerous restrictions on the mechanical design of the support legs and necessitates the use of leg structures which are thin (in the plane of the ring) in comparison to the ring rim. This reduced dimension renders these structures more susceptible to the effects of dimensional tolerancing in the production processes of the mechanical structure. This will result in variation in the mass and stiffness of these supporting leg elements which will disturb the symmetry of the mode dynamics and hence induce frequency splitting of the response modes.

The structures described in the prior art may be fabricated in a variety of materials using a number of processes. Where such devices are fabricated from metal these may be conveniently machined to high precision using wire erosion techniques to achieve the accurate dimensional tolerancing required. This process involves sequentially machining away material around the edges of each leg and the ring structure. The machining time, and hence production cost, increases in proportion to the number of legs. The number of legs hitherto thought to be required increases rapidly with mode order. Minimising the number of legs is therefore highly desirable, particularly for designs employing higher order modes. Similar considerations apply to structures fabricated from other materials using alternative processes.

It would be desirable to be able to design planar ring structures for use in two-axis rate sensor devices which provide a large fixed frequency split between the cos Nθ carrier mode and its complementary sin Nθ mode thus fixing its orientation on the ring structure. This should be achieved whilst maintaining the dynamic symmetry of the sin(N±1) θ/cos(N±1)θ response mode pair such that their frequencies are matched. It would be advantageous to use a reduced number of support leg structures.

SUMMARY OF THE INVENTION

According to a first aspect of the present invention, there is provided a two axis gyroscope including a substantially planar vibrator resonator having a substantially ring or hoop-like structure with inner and outer peripheries extending around a common axis, carrier mode drive means for causing the resonator to vibrate in a cos Nθ vibration mode, carrier mode pick-off means for sensing movement of the resonator in response to said carrier mode drive means, x-axis response mode pick-off means for detecting movement of the resonator in response to rotation about the x-axis, x-axis response mode drive means for nulling said motion, y-axis response mode pick-off means for detecting movement of the resonator in response to rotation about the y-axis, y-axis response mode drive means for nulling said motion, and support means for flexibly supporting the resonator and for allowing the resonator to vibrate relative to the support means in response to the drive means and to applied rotation, wherein the support means comprises only L legs, where, when L is even:

$$L=2N/K, \text{ and}$$

Where, when L is odd:

$$L=N/K$$

where K is an integer and L>2 and N is the carrier mode order.

By selecting a value of L according to these formulae, a desired large fixed frequency split may be provided between the cos Nθ carrier mode and its complementary sin Nθ mode thus fixing its orientation on the ring structure. This may be achieved whilst maintaining the dynamic symmetry of the sin(N±1)θ/cos(N±1)θ response mode pair such that their frequencies are matched. The number of support leg structures may also be reduced.

Preferably, L<4×N, as this simplifies the manufacturing process.

Each support beam may comprise first and second linear portions extending from opposite ends of an arcuate portion.

In the embodiment, the support beams are substantially equi-angularly spaced.

Conveniently, the support means includes a base having a projecting boss, with the inner periphery of the substantially ring or hoop-like structure to the projecting boss so that the ring or hoop-like structure is spaced from the base.

In the embodiment, the total stiffness of the support beams is less than that of the ring or hoop-like structure.

The formulae defined above have been obtained as a result of a detailed analysis of the dynamics of the ring or hoop-like structure including the effects of leg motion. The present invention may provide increased design flexibility allowing greater leg compliance (relative to the ring) whilst employing increased leg dimensions (in the plane of the ring). Such designs may exhibit reduced sensitivity to dimensional tolerancing effects and allow more economical fabrication.

BRIEF DESCRIPTION OF THE DRAWINGS

For a better understanding of the present invention, and to show how the same may be carried into effect, reference will now be made, by way of example, to the accompanying drawings, in which.

DETAILED DESCRIPTION OF EMBODIMENTS

Figure 1:
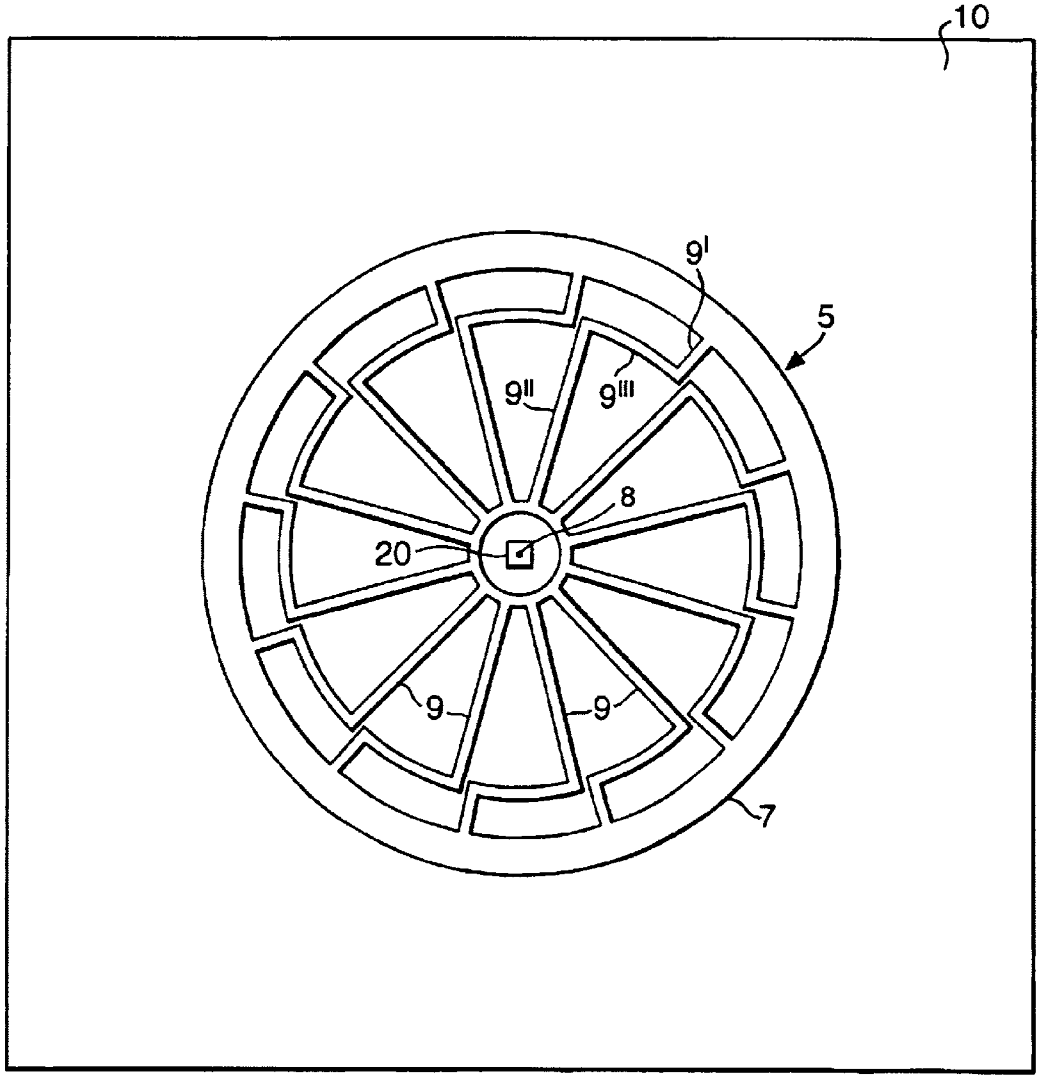
FIG. 1 is a plan view of a vibrating structure gyroscope not according to the invention, having twelve support legs.
Figure 2:
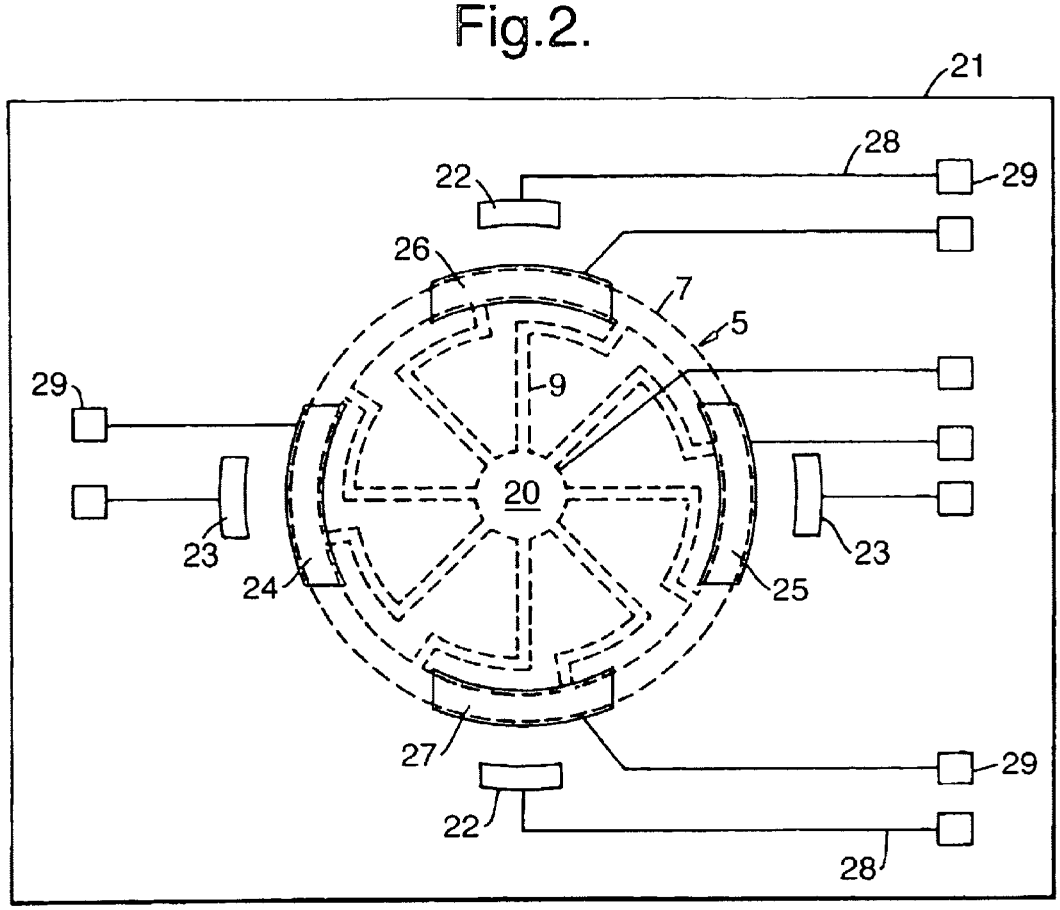
FIG. 2 shows in plan view a two axis rate sensor according to the present invention.

FIG. 2 shows in plan a sensor for sensing applied rate on two axes. This sensor is described by way of example only, and it should be understood that other arrangements could be used in accordance with the present invention.

The vibrating structure 5 has a substantially planar substantially ring-like shape having an outer rim 7, legs 9 and a central boss 20 as previously described. The structure 5 is located via the boss 20 on an insulating substrate layer 10 which may be made of glass or silicon with an insulating oxide surface layer. The vibrating structure 5 is maintained at a fixed voltage with respect to all the conductors which act as the drive and pick-off elements.

In FIG. 2 means for vibrating the silicon vibrating structure 5 in a Cos 2θ carrier mode includes two electrostatic carrier drive elements 22 and two electrostatic carrier mode pick-off elements 23 arranged with the drive elements 22 at 0° and 180° and the pick-off elements 23 at 90° and 270° respectively with respect to the outer rim 7 of the vibrating structure 5 and located radially externally of the outer rim 7 adjacent the points of maximum radial motion of the rim 7 when vibrating in the Cos 2θ mode. These carrier mode drive elements 22 are used to set the vibrating structure 5 into oscillation. The carrier mode pick-off elements 23 which are located at the carrier mode anti-nodal points, sense the radial motion of the vibrating structure 5.

The drive elements may be electromagnetic, electrostatic, piezo, thermal or optical in actuation and the vibrating structure 5 motion may be detected using electrostatic, electromagnetic, piezor or optical techniques.

The means for detecting the rocking mode vibration includes an x axis electrostatic drive element 24, an x axis electrostatic pick-off element 25 located adjacent the outer rim 7 in superimposed relationship therewith at a perpendicular spacing therefrom with the y axis drive element 26, the x axis pick-off element 25, the y axis pick-off element 27 and the x axis drive element 24 being arranged at 0°, 90°, 180 and 270° respectively around the outer rim 7.

Figure 3:
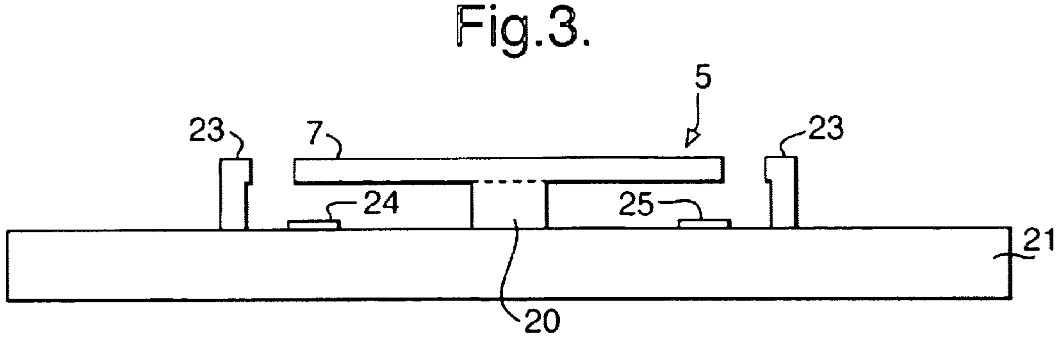
FIG. 3 is an edge view of a detail of the embodiment of FIG. 2.

The rocking motion of the x axis rate response mode is detected at the pick-off element 25 located on the surface of the support substrate under the rim 7. This motion is nulled using the x axis drive element 24 similarly located under the opposite side of the rim 7. The y axis rate response motion is similarly detected by pick-off element 27 and nulled by drive element 26. The various drive and pick-off conductive sites are connected, via tracking 28 laid onto the substrate layer surface 21, to bond pads 29. The drive and pick-off circuitry is then connected to these bond pads. A cross-section of the sensor of FIG. 2 is shown in FIG. 3. This shows the topography of the in plane and surface conductors more clearly.

A detailed analysis of the dynamics of the ring including the effects of the leg motion has enabled simple formulae to be developed which prescribe the range of options available in terms of the number of substantially evenly spaced support legs required to maintain frequency matching of the desired vibration mode pairs.

The analysis indicates that the requirement on the number of legs is far less restrictive than previously indicated. Simple formulae have been derived indicating which modes will have their frequency split for a given number of evenly spaced support legs. These formulae are applicable to both in plane and out of plane modes and are valid for L>2. If L<2 then all modes will be split. For an even number of legs, L, frequency splitting for a mode of order N will only occur when the following condition is met:

$$N = \frac{LK}{2}$$

where K is an integer. Maximum frequency splitting occurs when K=1 and reduces as K is increased. If the number of legs, L, is odd then frequency splitting will only occur where:

$$N=LK$$

The maximum splitting again occurs for K=1 and decreases as the value of K increases.

The practical implication of these formulae is that the criteria for maintaining frequency matching for any in plane or out of plane sin Nθ/cos Nθ mode pair are considerably less restrictive than previously realised. These formulae also allow arrangements of support leg structures to be devised which achieve the required frequency splitting of the cos Nθ carrier mode and its complementary sin Nθ mode whilst maintaining the frequency matching of the sin(N±1)θ/cos (N±1)θ response mode pair.

Figure 4:
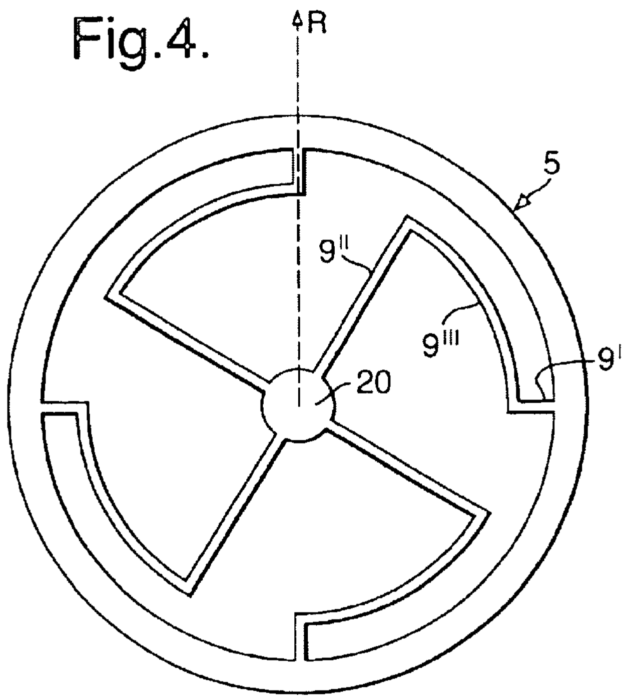
FIG. 4 is a plan view of a vibrating structure (resonator) having four support legs according to the present invention.
Figure 5A:
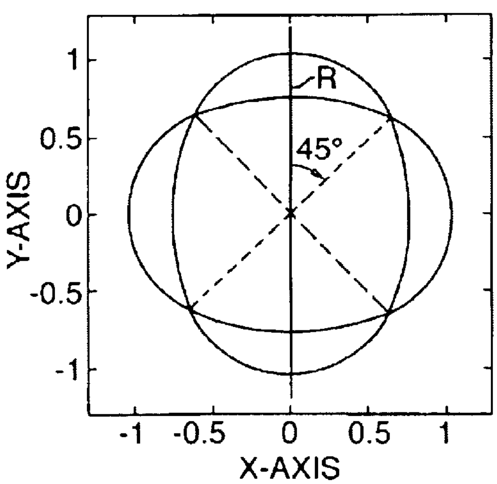
FIG. 5A shows diagrammatically an in plane Cos 2θ mode vibration in a symmetric resonator or vibrating structure acting as a carrier mode.
Figure 5B:
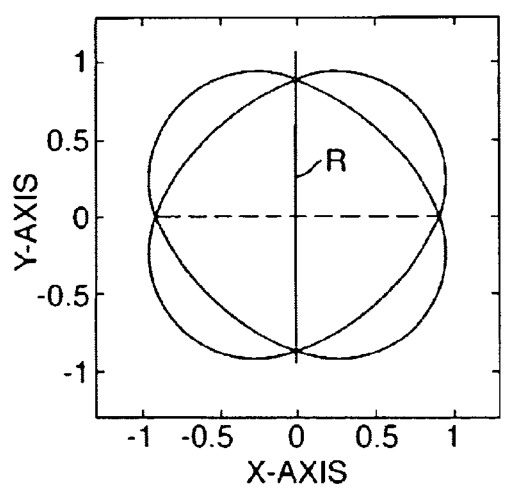
FIG. 5B is a diagrammatic illustration of an in plane sin 2θ mode acting as a response mode.
Figure 6A:
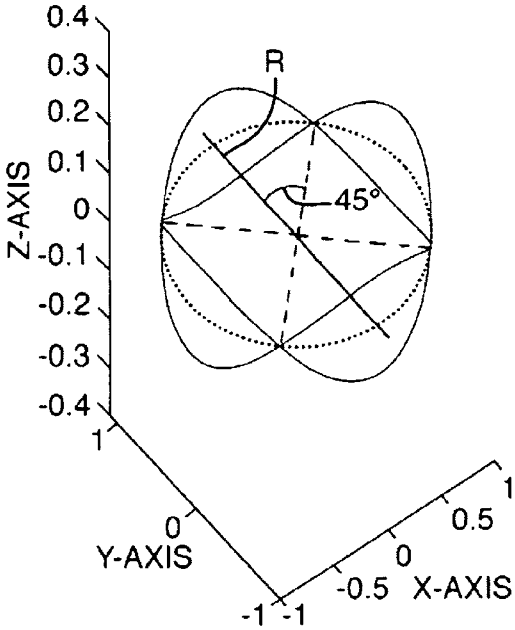
FIGS. 6A and 6B show diagrammatically the alignment of the out of plane cos 2θ/sin 2θ modes.
Figure 6B:
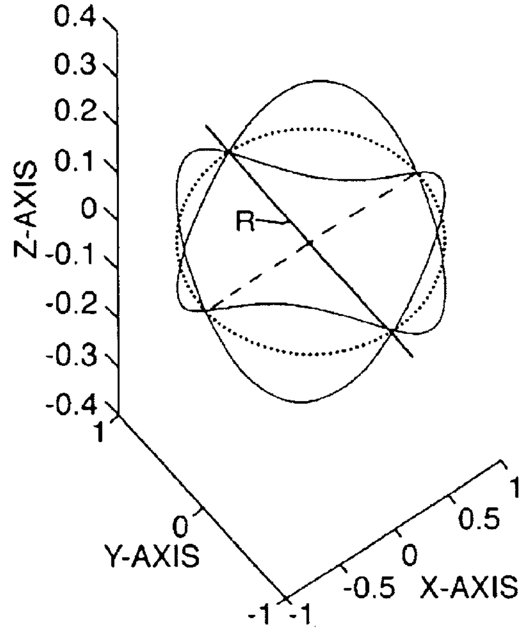

For device designs employing a cos 2θ in plane or out of plane carrier mode the required mode splitting may be achieved using four support legs at 90° separation as shown in FIG. 4. The formulae confirm that the use of four support legs does not split the frequencies of either the sin θ/cos θ(N−1=1) mode pair or the sin 3θ/cos 3θ(N+1=3) mode pair. Two axis rate sensors may be designed using either of these mode pairs as response modes. When using an in plane carrier mode, the points of attachment of the legs to the ring will align directly with the radial anti-nodes of one mode and will coincide with the radial nodes of the complementary mode. The resulting alignment of the plane sin 2θ/cos 2θ modes with respect to the resonator structure are shown in FIGS. 5A and 5B where the 0° angle corresponds to the 0° reference, R, in FIG. 4. When using an out of plane carrier mode, the points of attachment of the legs will coincide with anti-nodes of the out of plane motion of one mode and the nodes of the complementary mode. FIGS. 6A and 6B show the resulting alignment of the out of plane sin 2θ/cos 2θ modes with respect to the resonator structure. The matching of the carrier mode frequency with the desired sin (N±1)θ/cos(N±1)θ response mode frequencies is typically achieved by adjusting the depth (z-axis dimension) of the ring. This shifts the frequencies of the out of plane modes but leaves the in plane mode frequencies substantially constant.

Figure 7:
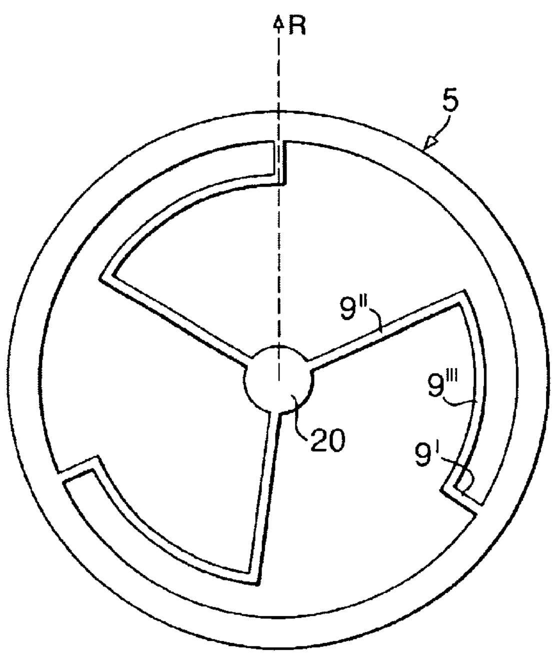
FIG. 7 is a plan view of a vibrating structure having three support legs according to the present invention.
Figure 8:
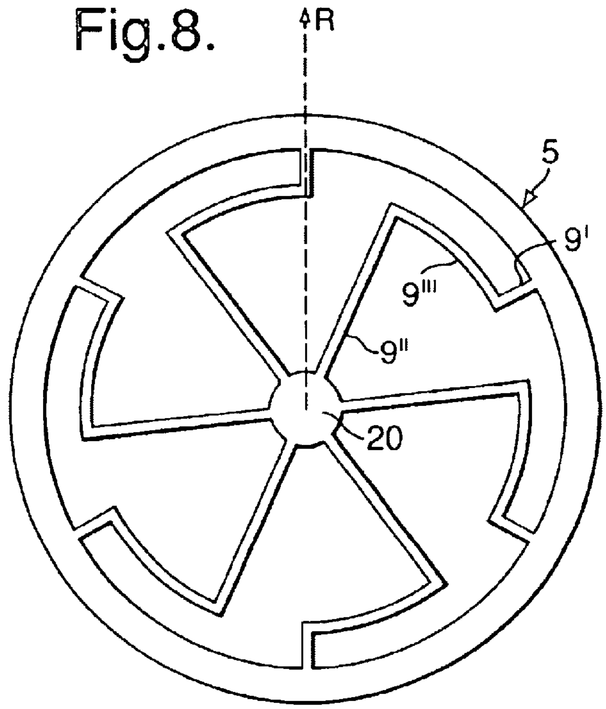
FIG. 8 is a plan view of a vibrating structure having six support legs; according to the present invention.
Figure 9A:
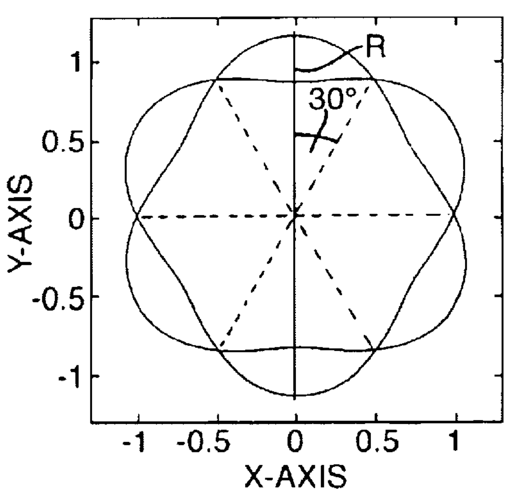
FIGS. 9A and 9B show in plane sin 3θ/cos 3θ modes
Figure 9B:
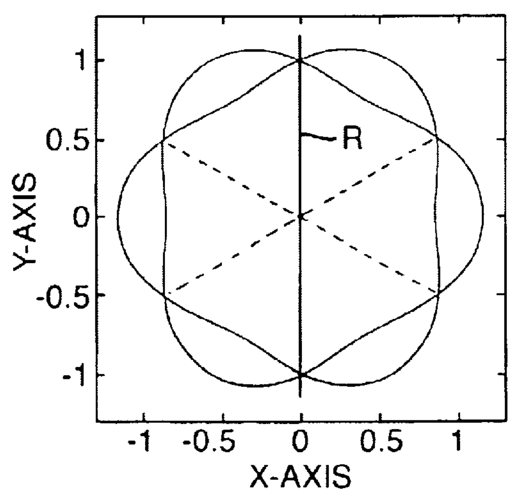
Figure 10A:
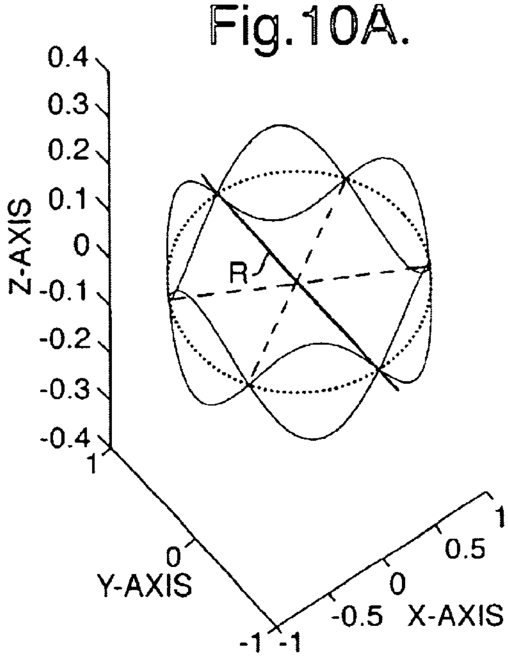
FIGS. 10A and 10B show diagrammatically alignment of the out of plane sine 3θ/cos 3θ modes.
Figure 10B:
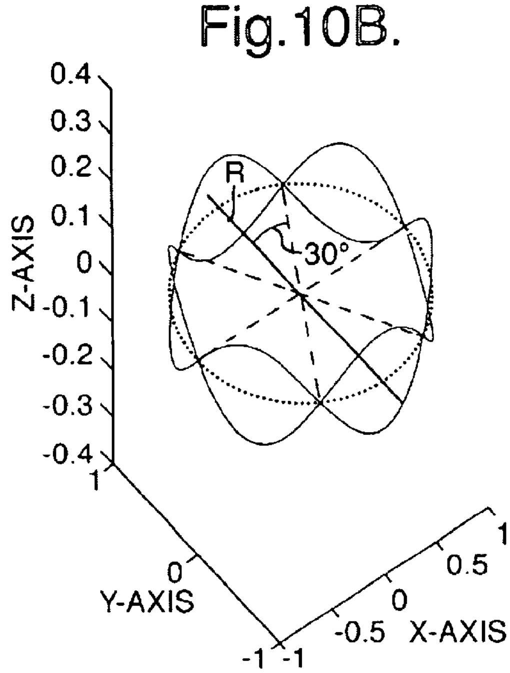
Figure 13A:
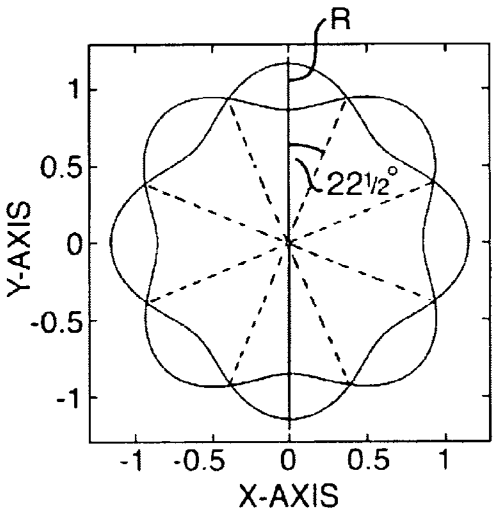
FIGS. 13A and 13B show diagrammatically in plane sin 4θ/cos 4θ modes.
Figure 13B:
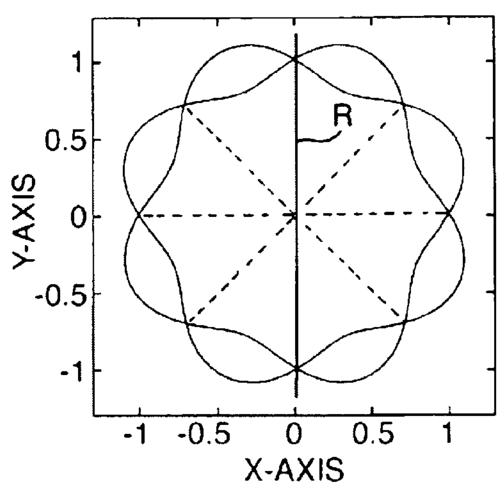

For device designs employing a cos 3θ in plane or out of plane carrier mode the required mode splitting may be achieved using three support legs with 120° separation or with six support legs at 60° separation as show in FIGS. 7 and 8 respectively. The formulae confirm that the use of three or six support legs does not split the frequencies of either the sin 2θ/cos 2θ(N−1=2) or the sin 4θ/cos 4θ(N+1=4) mode pairs both of which maybe used in combination with this carrier mode. When using an in plane carrier mode, the points of attachment of the legs to the ring will align directly with the radial anti-nodes of one mode and will coincide with the radial nodes of the complementary mode. The resulting alignment of the in plane sin 3θ/cos 3θ modes with respect to the resonator structure are shown in FIGS. 13*a* and 13*b* where the 0° reference, R, in FIGS. 7 and 8. When using an out of plane carrier mode, the points of attachment of the legs will coincide with anti-nodes of the complementary mode. FIGS. 10A and 10B show the resulting alignment for the out of plane sin 3θ/cos 3θ modes with respect to the resonator structure.

Figure 11:
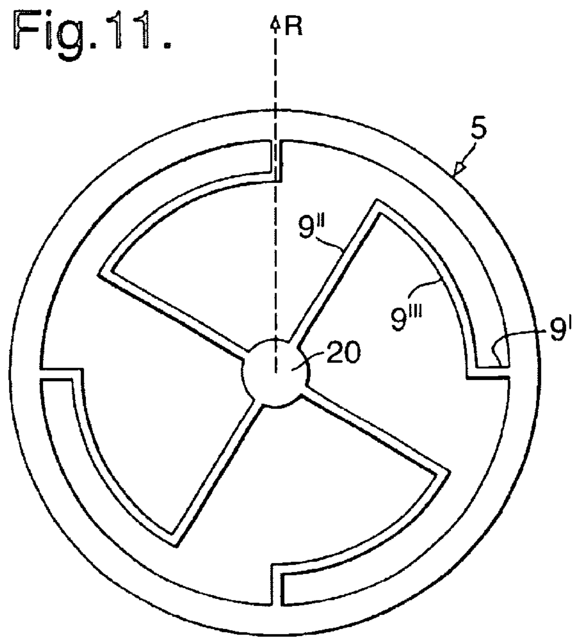
FIG. 11 is a plan view of a vibrating structure having four support legs according to the present invention.
Figure 12:
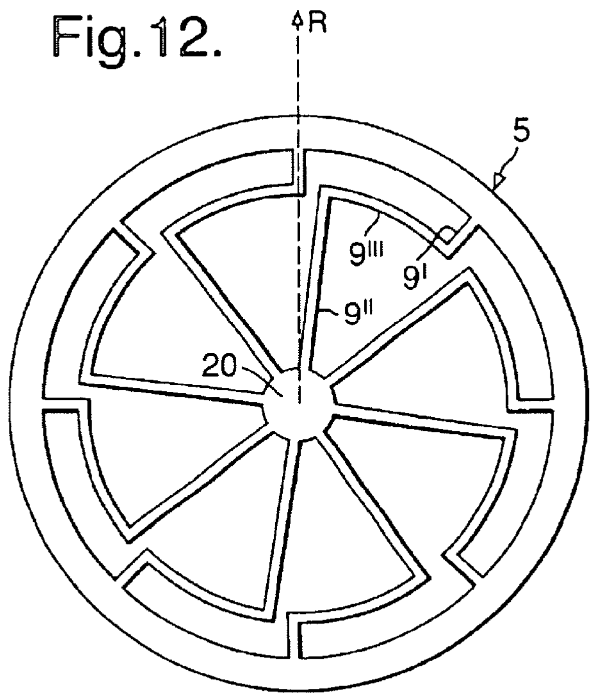
FIG. 12 is a plan view of a vibrating structure having eight support legs according to the present invention.
Figure 14A:
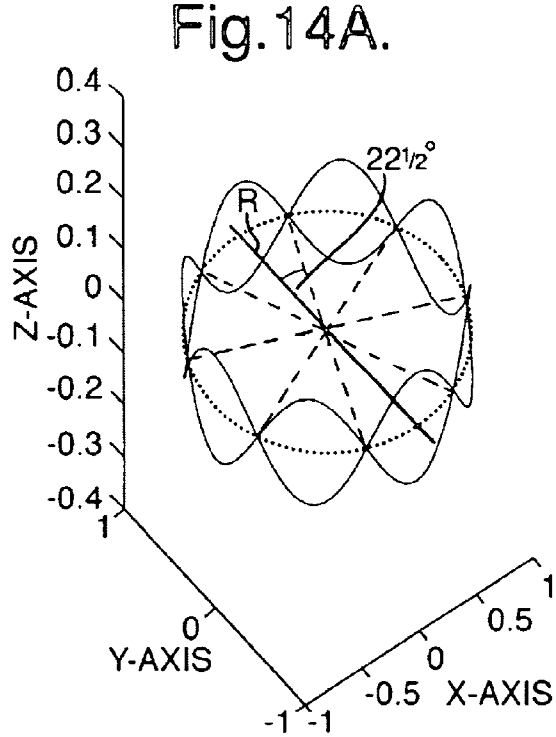
FIGS. 14A and 14B show diagrammatically out of plane cos 4θ/sine 4θ modes.
Figure 14B:
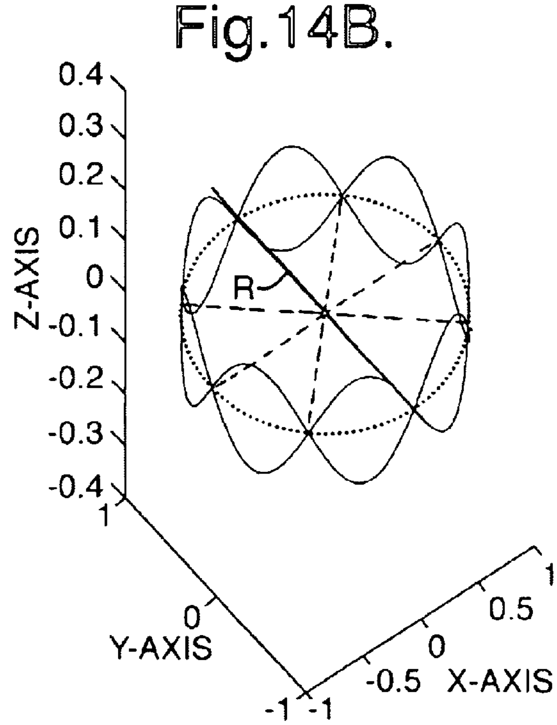

For device designs employing a cos 4θ in plane or out of plane carrier mode the required mode splitting may be achieved by four support legs at 90° separation or with eight support legs at 45° separation as shown in FIGS. 11 and 12. The formulae confirm that the use of 4 or 8 support legs does not split the frequencies of either the sin 3θ/cos 3θ(N−1=3) or the sin 5θ/cos 5θ(N+1=5) mode pairs both of which may be used in combination with this carrier mode. When using an in plane carrier mode, the points of attachment of the legs to the ring will align directly with the radial anti-nodes of one mode and will coincide with the radial nodes of the complementary mode. The resulting alignment of the in plane sin 4θ/cos 4θ modes with respect to the resonator structure are shown in FIGS. 14A and 13B where the 0° angle corresponds to the 0° R, reference in FIGS. 11 and 12. When using an out of plane carrier mode, the points of attachment of the legs will coincide with anti-nodes of the out of plane motion of one mode and the nodes of the complementary mode. FIGS. 14A and 14B show the resulting alignment for the out of plane sin 4θ/cos 4θ modes with respect to the resonator structure.

For out of plane carrier modes the drive and pick-off elements are conveniently located directly above and/or below the anti-nodes of the out of plane motion. For in plane carrier modes the drive and pick-off elements are conveniently located adjacent to the radial anti-nodes in the plane of the ring. The optimum alignment for the drive and pick-off elements is therefore achieved without the requirement for any trimming or adjustment of the mode positions. For single axis devices it is know that tolerancing affects in the fabrication process may lead to small imbalances in cos nθ mode frequencies. These may be corrected, using mechanical trimming techniques such as described in GB-A-2292609 which describes a trimming procedure suitable for use with in plane sin Nθ/cos Nθ modes. It is likely that such techniques will need to be applied to the response modes for two axis devices. Due to the large imbalance between the carrier mode and its compliment for the structures described here, the mode alignment will be unaffected by such trimming procedures.

The resonator designs shown in FIGS. 4,7,8,11 and 12 provide structures suitable for use in two axis rate sensors. These designs provide a carrier mode whose position is fixed with respect to the resonator structure which is isolated in frequency from its complementary mode. This is generally achieved using a number of support leg structures which is reduced from those of the prior art. This provides increased design flexibility allowing the ratio between the combined leg stiffness and the ring stiffness to be maintained at required value using increased leg dimensions (in the plane of the ring). Such designs exhibit reduced sensitivity to dimensional tolerancing effects and allow for more economical fabrication, particularly for structures machined from metals.

In all resonator designs the combined stiffness of the support legs is required to less than that of the ring. This ensures that the modal vibration is dominated by the ring structure and helps to isolate the resonator from the effects of thermally induced stresses coupling in via the hob 20 of the structure, which will adversely affect performance. When employing fewer support legs the required leg to ring compliance ratio may be maintained by using longer support leg structures of increased width.

What is claimed is:

1. A two axis vibrating ring gyroscope, said gyroscope comprising:

a substantially planar vibratory resonator having a substantially ring or hoop-like structure with inner and outer peripheries extending around a common axis, carrier mode drive means for causing the resonator to vibrate in a cosnθ vibration mode, carrier mode pick-off means for sensing movement of the resonator in response to said carrier mode drive means, X-axis response mode pick-off means for detecting movement of the resonator in response to rotation about the X-axis, X-axis response mode drive means for nulling said movement of the resonator in response to rotation about the X-axis, y-axis response mode pick-off means for detecting movement of the resonator in response to rotation about the y-axis, y-axis response mode drive means for nulling said movement of the resonator in response to rotation about the y-axis, and support means for flexibly supporting the resonator and for allowing the resonator to vibrate relative to the support means, wherein the support means comprises only L legs, where, when L is even: $L=2N/K$, and where, when L is odd: $L=N/K$ where K is an integer, wherein $L>2$ when N is the carrier mode order fixing the carrier mode orientation on the ring or hoop-like structure, and wherein $L<4N$ when N is the response mode order.

2. A rate sensor according to claim 1, wherein each leg comprises first and second linear portions extending from opposite ends of an arcuate portion.

3. A rate sensor according to claim 1, wherein the legs are substantially equi-angularly spaced.

4. A rate sensor according to claim 1, wherein the support means includes a base having a projecting boss, with the inner periphery of the substantially ring or hoop-like structure being coupled to the boss by the legs which extend from said inner periphery of the ring or hoop like structure to the projecting boss so that the ring or hoop-like shape structure is spaced from the base.

5. A rate sensor according to claim 1, wherein the total stiffness of the legs are less than that of the ring or hoop-like shape structure.

* * * * *